Patented Mar. 17, 1942

2,276,882

UNITED STATES PATENT OFFICE 2,276,882

GASTRIC MUCIN PRODUCT AND PROCESS FOR PRODUCING SAME

Herman J. Schneiderwirth, Mount Vernon, N. Y.

No Drawing. Application February 23, 1940, Serial No. 320,420

8 Claims. (Cl. 260—112)

My invention relates to the preparation of new mucin products obtained by the chemical treatment of gastric mucins obtained from the mucus.

One object of the invention is to produce new gastric mucin products having chemical and physical properties different from natural, untreated gastric mucins available today.

Another object of the invention is to produce new gastric mucin products which are superior to available mucins when used as therapeutic agents in the forms of medication described later.

Gastric mucin, obtained from the mucus covering the stomach lining of animals, is used today successfully in the treatment of peptic ulcers. Its only application is by way of mouth in a powdered, or granulated, form, taken either dry or mixed with water or with other liquids.

I have experimented with mucins for several years with the purpose of producing new mucin products most suitable for therapeutic use in pathogenic conditions other than gastric ulcers. The main purpose has been to produce new mucin products most suitable for topical application of this vital biological substance to accessible mucous membranes, such as the rectum and the colon.

Dried gastric mucin, as available today, is a grayish powder with a slightly salty taste and a peculiar peptone-like, rather unpleasant odor. A gray, viscous opalescent solution is obtained when the powder is triturated with water.

I have now found that such a mucin cannot be used with advantage for topical applications because it has the tendency to form a gelatinous "mucous plug" when spread over the mucosa in a concentration necessary to assure effective therapeutic action. Such a mucous plug does not mix well with the mucosa to which it is applied and is subsequently expelled with ease. This is of particular disadvantage when mucin is applied topically to the rectal, or colonic, mucosa when waste products constantly pass over the mucin covered area.

I have now produced new gastric mucin products which overcome the above stated unfavorable conditions, which products are different physically as well as chemically from natural gastric mucins.

In the following, examples are given describing the preparation of such products together with comparative chemical and physical tests.

EXAMPLE 1

300 grams of gastric mucin powder are triturated in a mortar by gradually adding 7280 cc. of distilled water at a temperature of from 50 to 60 degrees centigrade. The solution is acid having a pH of approximately 4.5. Now gradually, 320 cc. of concentrated ammonia water containing approximately 28% of ammonia gas is added while stirring and keeping the mixture at a temperature of from 50 to 60 degrees centigrade for 20 minutes. The mixture thus obtained contains approximately 4% mucin and 1.2% of ammonia gas. It is now put aside for approximately 48 hours at room temperature. Thereafter a clear yellow solution of a mucin product has formed above a precipitate. The precipitate is removed preferably by centrifugation. The clear solution is decolorized by means of a decolorizing agent such as infusorial earth, or others, and evaporated in flat trays preferably in a vacuum oven at a temperature not exceeding 60 degrees centigrade. The dry product forms transparent, light yellow scales soluble in water, having a slightly acid reaction pH 6.0 to pH 6.5. The water solutions are transparent, practically colorless, and practically odorless.

The scales are insoluble in benzene, toluene, alcohol, acetone, chloroform, ether, and other organic solvents. The scales are soluble in water in all proportions forming viscous solutions. Their viscosity increases with their concentration until a sticky paste is formed at a concentration of approximately 20%. When water solutions of the scales are well shaken for a time with the above-mentioned organic solvents excepting alcohol and acetone, a white somewhat stable emulsion is formed with the mucin solutions. When alcohol or acetone are added to the water solutions of the mucin, a white precipitate is formed. 5 cc. of a 3% solution of the mucin having a pH of 6.5 need an addition of 7.5 cc. of methyl alcohol to produce a precipitate. When, however, the pH of the mucin solution is changed to the acid or alkaline side, the amount of alcohol needed to produce a precipitate decreases. The mucin water solutions mix with pyridine in all proportions. The average nitrogen content of the mucin is 8.3% using the Kjeldahl method.

EXAMPLE 2

A neutralized solution of gastric mucin containing approximately 4% of mucin is treated in the same way as described in Example 1. When the neutralizing agent was a non-volatile alkaline reacting agent such as sodium or potassium hydroxide, the obtained end-product reacts neutral, showing otherwise the same properties as described above.

EXAMPLE 3

An alykalized solution of gastric mucin containing approximately 4% of mucin is treated in the same way as described in Example 1. When the alkalizing agent was a non-volatile agent such as sodium or potassium hydroxide, the end-product naturally reacts alkaline. The degree of alkalinity as well as the nitrogen content of this product depends upon the amount of alkali added before the ammonia treatment commences.

Instead of using ammonia water, the same results are obtained when ammonia gas is slowly passed through a warm mucin solution until the concentration of ammonia gas is approximately 1.2%. Similar results may be obtained when the concentration of ammonia gas in the solution is lower or higher than 1.2%, the approximate limits being 0.5 to 2.0% of ammonia.

In order to show the chemical and physical differences between the mucin products obtained in the above examples and the mucins obtainable today, the following tests are submitted.

A. CHEMICAL TESTS

In order to carry the tests out under exactly identical conditions, the acid reacting natural mucins were first adjusted to a pH 6.5 by adding ammonia water to a solution of these mucins and evaporating said solution to dryness.

Test 1

To two test tubes, one of which contained 5 cc. of a 4% solution of natural mucin adjusted to pH 6.5 by the addition of ammonia water and subsequent evaporation to dryness while another contained an identical solution of ammonia treated mucin, each 2 cc. of methyl alcohol were added and well mixed. Now 0.5 cc. of a saturated solution of mercury bichloride were added to each tube and the latter were shaken well and kept in a water bath at a temperature of approximately 60 degrees centigrade for from 10 to 15 minutes. After cooling to room temperature, the tube containing the natural mucin solution shows a voluminous, flaky coagulate which slowly accumulates at the top of the solution. The tube containing the ammonia treated mucin shows no coagulate.

Test 2

Add to 5 cc. of 4% solutions of the two mucin products each 3 cc. of concentrated hydrochloric acid. After shaking well, add 1.0 cc. of a 0.5% solution of calcium chloride and shake the whole for approximately 20 minutes. After standing for several hours, the tube containing the natural mucin develops a light pink color in a cloudy solution while the tube containing the ammonia treated mucin remains colorless.

Test 3.

To 500 cc. of a 4% natural mucin solution and to 500 cc. of a 4% ammonia treated solution, both pH 6.5, add 1000 cc. of methanol (methyl alcohol) while stirring.

A precipitate develops in both solutions which is removed by filtration after 24 hours standing. Add to the alcoholic filtrate 0.4 cc. of concentrated hydrochloric acid. A second precipitate develops in both solutions and is also removed after 24 hours standing. The four precipitates are dried at a temperature of not more than 60 degrees centigrade and thereupon their nitrogen content is determined by the Kjeldahl method.

The results obtained were as follows:

| Natural mucin | | Ammonia treated mucin | |
|---|---|---|---|
| | N | | N |
| Precipitate #1 pH 6.5 | 8.0 | Precipitate #1 pH 6.5 | 6.9 |
| Precipitate #2 strongly acid | 7.1 | Precipitate #2 strongly acid | 8.5 |

REPEATED WITH NATURAL MUCIN OF A DIFFERENT MANUFACTURE

| | N | | N |
|---|---|---|---|
| Precipitate #1 pH 6.5 | 7.9 | Precipitate #1 pH 6.5 | 7.0 |
| Precipitate #2 strongly acid | 7.2 | Precipitate #2 strongly acid | 8.6 |

These tests show that under the conditions described the nitrogen content of the two fractional precipitates of natural mucin decreases with increasing acidity of the alcoholic solutions while the nitrogen content of the two fractional precipitates of ammonia treated mucin increases with increasing acidity of the alcoholic solution.

B. PHYSICAL CHARACTERISTICS

| Natural mucins | Ammonia treated mucins |
|---|---|
| Solutions: Color: gray, opalescent | Clear, transparent slightly yellow color. |
| Odor: unpleasant, strong, peptone-like smell. | Slight peptone-like smell. |

Relative viscosity compared with water (1.0) using 10 cc. Mohr pipet and 2% solutions of mucins:

| Natural mucin | Ammonia treated mucin |
|---|---|
| 2.4 | 1.9 |

I have found that the new mucin products described herein are valuable biological substances for therapeutic use particularly when applied topically to accessible mucous membranes like those of the rectum and the colon. These mucin products intimately adhere to the mucosa and are not easily washed away by watery waste matter. A further important property of these mucins is their unusually strong power to form stable adsorption products with well known therapeutics thereby increasing the medical action of the latter. To illustrate this, I have prepared among others a mucin adsorption product in the form of a water soluble jelly containing approximately 2% of a normally water insoluble anaesthetic chemical named ethyl amino benzoate. This chemical, when incorporated into the mucin described above, under certain conditions forms a stable water soluble colloidal adsorption product with this mucin and thereby increases and prolongs the anaesthetic action of ethyl amino benzoate.

The mucins of my invention play a similar role in the treatment of mucous membranes as wool fat (lanoline) does in the treatment of the skin. As both of these substances are biologically akin to the parts of the body to which they are applied, they are superior to other substances when used alone and particularly when used as a base or a carrier for an indicated medication. Lanoline has already abundantly demonstrated this.

I do not limit myself to the particular quantities, times, temperatures, chemicals, or steps of procedure mentioned and described as these are given solely for the purpose of clearly describing my invention.

What I claim is:

1. A process for the treatment of natural gastric mucin, which comprises treating natural gastric mucin with an excess of ammonia, separating the thus formed precipitate from the liquid, and evaporating the liquid to dryness.

2. A process for the treatment of natural gastric mucin, which comprises treating neutralized natural gastric mucin with an excess of ammonia, separating the thus formed precipitate from the liquid, and evaporating the liquid to dryness.

3. A process for the treatment of natural gastric mucin, which comprises treating alkaline natural gastric music with an excess of ammonia, separating the thus formed precipitate from the liquid, and evaporating the liquid to dryness.

4. A process for the treatment of natural gastric mucin, which comprises treating natural gastric mucin with an excess of ammonia to produce a solution containing not more than 2.0% of ammonia, separating the thus formed precipitate from the liquid, and evaporating the liquid to dryness.

5. A process for the treatment of natural gastric mucin, which comprises treating natural gastric mucin with an excess of ammonia to produce a solution containing not less than 0.5% of ammonia, separating the thus formed precipitate from the liquid, and evaporating the liquid to dryness.

6. A therapeutic gastric mucin produced by treating natural gastric mucin with an excess of ammonia and which in its dry form is transparent, light yellow scales, which is colorless in a hydrochloric acid solution of calcium chloride, and a solution of which does not coagulate upon the addition of mercury bichloride.

7. A therapeutic gastric mucin produced by treating neutralized natural gastric mucin with an excess of ammonia and which in its dry form is transparent, light yellow scales, which is colorless in a hydrochloric acid solution of calcium chloride, and a solution of which does not coagulate upon the addition of mercury bichloride.

8. A therapeutic gastric mucin produced by treating alkaline natural gastric mucin with an excess of ammonia and which in its dry form is transparent, light yellow scales, which is colorless in a hydrochloric acid solution of calcium chloride, and a solution of which does not coagulate upon the addition of mercury bichloride.

HERMAN J. SCHNEIDERWIRTH.